(12) United States Patent
Chen

(10) Patent No.: US 7,451,523 B2
(45) Date of Patent: Nov. 18, 2008

(54) HINGE

(75) Inventor: Wei-Chun Chen, Shulin (TW)

(73) Assignee: Shin Zu Shing Co., Ltd. (TW)

( * ) Notice: Subject to any disclaimer, the term of this patent is extended or adjusted under 35 U.S.C. 154(b) by 446 days.

(21) Appl. No.: 11/400,652

(22) Filed: Apr. 7, 2006

(65) Prior Publication Data

US 2007/0234519 A1    Oct. 11, 2007

(51) Int. Cl.
E05D 11/08    (2006.01)
(52) U.S. Cl. ...................................................... 16/342
(58) Field of Classification Search .................. 16/342, 16/337–340, 330, 303, 273, 274, 71, 49, 16/51, 50; 455/575.1, 575.3, 575.4, 575.8, 455/550.1, 90.3; 379/433.12, 433.13; 348/373, 348/794, 333.06; 361/680–683
See application file for complete search history.

(56) References Cited

U.S. PATENT DOCUMENTS

| | | | | | |
|---|---|---|---|---|---|
| 5,896,622 | A | * | 4/1999 | Lu ................................ | 16/342 |
| 6,101,676 | A | * | 8/2000 | Wahl et al. .................... | 16/342 |
| 6,256,838 | B1 | * | 7/2001 | Lu ................................ | 16/342 |
| 7,124,473 | B2 | * | 10/2006 | Lu et al. ........................ | 16/342 |
| 2007/0101543 | A1 | * | 5/2007 | Lu et al. ........................ | 16/342 |
| 2007/0143963 | A1 | * | 6/2007 | Chern .......................... | 16/342 |

* cited by examiner

*Primary Examiner*—Chuck Y. Mah
(74) *Attorney, Agent, or Firm*—William E. Pelton, Esq.; Cooper & Dunham LLP

(57) ABSTRACT

A hinge has a stationary bracket having multiple limiting slots, two resilient spacers, a pintle having a bar and an enlarged head, a stop element mounted in the pintle between the enlarged head and the resilient spacers and having multiple limiting tabs corresponding to and mounted in the limiting slots in the stationary bracket to make the limiting tab and the pintle to seal the opening and a keyhole provided the pintle to mount in and having an inner diameter being not bigger than an outer diameter of the bar to provide a tightness between the keyhole and the pintle. So the pintle is sturdy in the sleeve and the oil would not leak out of the sleeve.

6 Claims, 6 Drawing Sheets

HINGE

BACKGROUND OF THE INVENTION

1. Field of Invention

The present invention relates to a hinge, and more particularly to a hinge that is sturdy and prevent oil from leaking out.

2. Description of the Related Art

Many mechanical appliances and electronic devices having a base and a cover which pivots relative to the base can be found in our daily life. A hinge is usually mounted between the body and the cover and pivots to open or close the cover. A conventional hinge basically has a stationary bracket, at least one resilient spacer and a pintle. The stationary bracket is attached to the base of the appliance and has a sleeve. The sleeve has an opening. The resilient spacer has an inner diameter. The pintle is attached to the cover of the appliance, is mounted rotatably in the resilient spacer and has an outer diameter. The pintle and the resilient spacer protrude into the sleeve form the opening and are mounted in the stationary bracket.

Generally, the hinge further has lubricating oil provided on the pintle and in the sleeve to make the hinge pivot smoothly. However, the conventional hinge does not have any stop element in the opening of the stationary bracket so that the lubricating oil would leak out and cover with dust to influence the hinge to pivot. Furthermore, the size between the inner diameter of the resilient spacer and the outer diameter of the pintle has a little discrepancy to produce intervals, so the pintle would shake in the intervals when the hinge pivots.

To overcome the shortcomings, the present invention provides a hinge to mitigate or obviate the aforementioned.

SUMMARY OF THE INVENTION

The primary objective of the present invention is to provide a hinge that is sturdy and so configured that oil leakage is prevented.

To achieve the objective, the hinge has a stationary bracket having an opening and multiple limiting notches, two resilient spacers, a pintle having a bar and an enlarged pintle and a stop element mounted in the pintle between the enlarged head of the pintle and the resilient spacers and having multiple limiting tabs and a keyhole. The limiting tabs correspond to and are mounted securely in the limiting notches in the stationary bracket. The keyhole is mounted around the pintle and has an inner diameter corresponding to the outer diameter of the bar.

Because the inner diameter of the keyhole corresponds to the outer diameter of the bar, the keyhole and pintle are tight together. Furthermore, because the limiting tabs correspond to and are mounted in the limiting notches in the stationary bracket to make the stop element and the pintle seal the opening of the sleeve, the pintle is sturdy in the sleeve and the oil provided around the pintle would not leak out of the sleeve.

Other objectives, advantages and novel features of the invention will become more apparent from the following detailed description when taken in conjunction with the accompanying drawings.

DETAILED DESCRIPTION OF THE INVENTION

Figure 1:
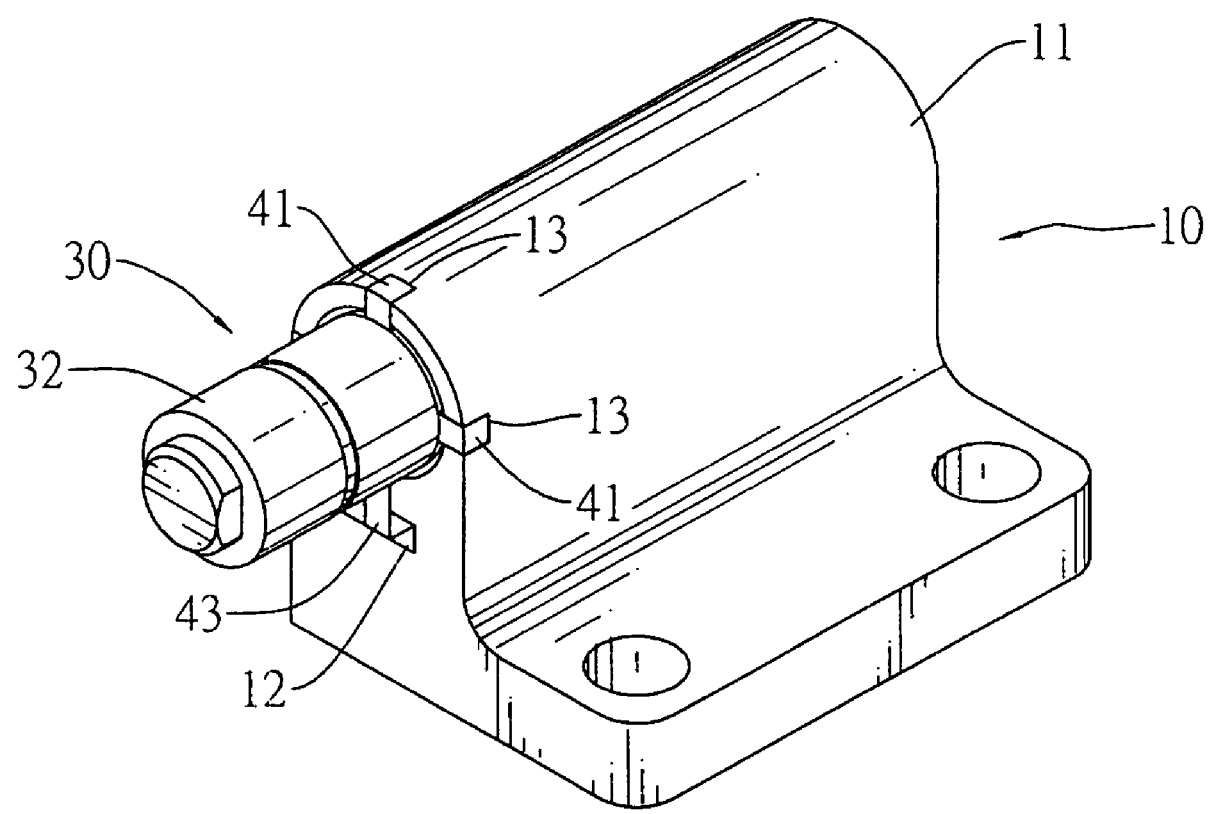
FIG. 1 is a perspective view of a first embodiment of a hinge in accordance with the present invention.
Figure 2:
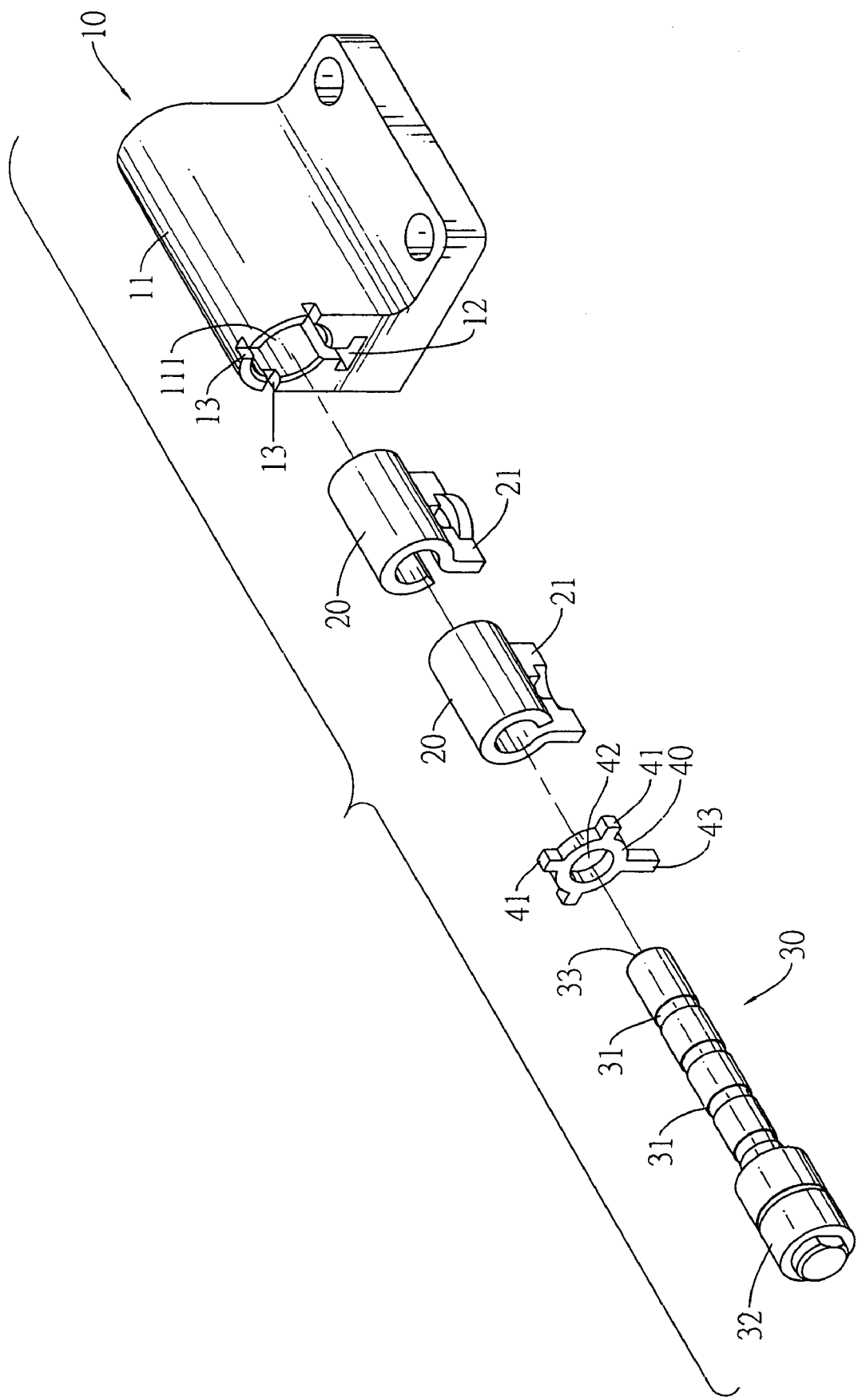
FIG. 2 is an exploded view of the hinge in FIG. 1.
Figure 3:
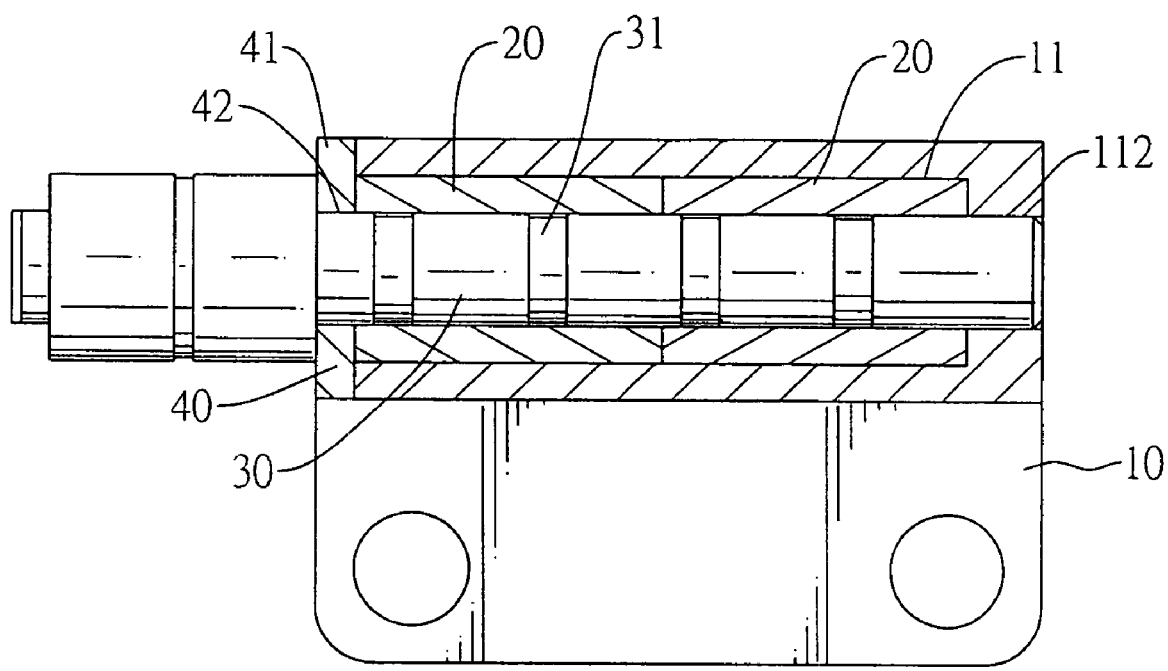
FIG. 3 is a top view in partial section of the hinge in FIG. 1.

With reference to FIGS. 1 to 3, a hinge in accordance with the present invention, which is mounted in an appliance with a base and a cover, has a stationary bracket (10), a pintle (30), two resilient spacer (20) and a stop element (40).

The stationary bracket (10) is attached to the base of the appliance and has a sleeve (11), multiple limiting notches (13) and an optional elongated keyway (12). The sleeve (11) is tubular and has a first end, a second end, a first opening (111) and an optional second opening (112). The first opening (111) is formed in the first end of the sleeve (11). The second opening (112) is formed in the second end of the sleeve (11) and has an inner diameter. The limiting notches (13) are formed in the first end of the sleeve (11) and are adjacent to the first opening (111). The elongated keyway (12) is formed longitudinally in the stationary bracket (10) and communicates with the first opening ( 111) in the sleeve (11).

Each resilient spacer (20) is mounted securely in the sleeve (11) and has an optional position-limiting tab (21). The position-limiting tab (21) is mounted securely in the elongated keyway (12) to make the resilient spacer (20) more firmly in the sleeve (11).

The pintle (30) is mounted rotatably in the resilient spacers (20) and has a bar and an enlarged head (32). The bar has multiple oil grooves (31), a protruding end (33) and an outer diameter. The oil grooves (31) are formed around the bar for containing lubricant oil inside. The protruding end (33) protrudes into the sleeve (11) from the first opening (11) to the second opening (112). The outer diameter of the bar of the pintle (30) is equal to the inner diameter of the second opening (112) to hold the pintle (30) in the sleeve (11). The enlarged head (32) is opposite to the protruding end (33) and has an outer wall.

The stop element (40) is mounted around the pintle (30) between the enlarged head (32) of the pintle (30) and the resilient spacers (20) and has multiple limiting tabs (41), a keyhole (42) and an optional key protrusion (43). The limiting tabs (41) extends radially out of the stop element (40) and correspond to and are mounted in the limiting notches (13) in the stationary bracket (10) to hold the stop element (40) securely in the stationary bracket (10). The keyhole (42) is mounted around the pintle (30) and has an inner diameter. The inner diameter of the keyhole (42) corresponds to the outer diameter of the bar to provide a tightness between the keyhole (42) and pintle (30), so that the pintle (30) is sturdy and the lubricant oil inside the oil grooves (31) would not leak out of the sleeve (11). The key protrusion (43) extends radially out of the stop element (40) and is mounted securely in the elongated keyway (12) in the stationary bracket (10).

Figure 4:
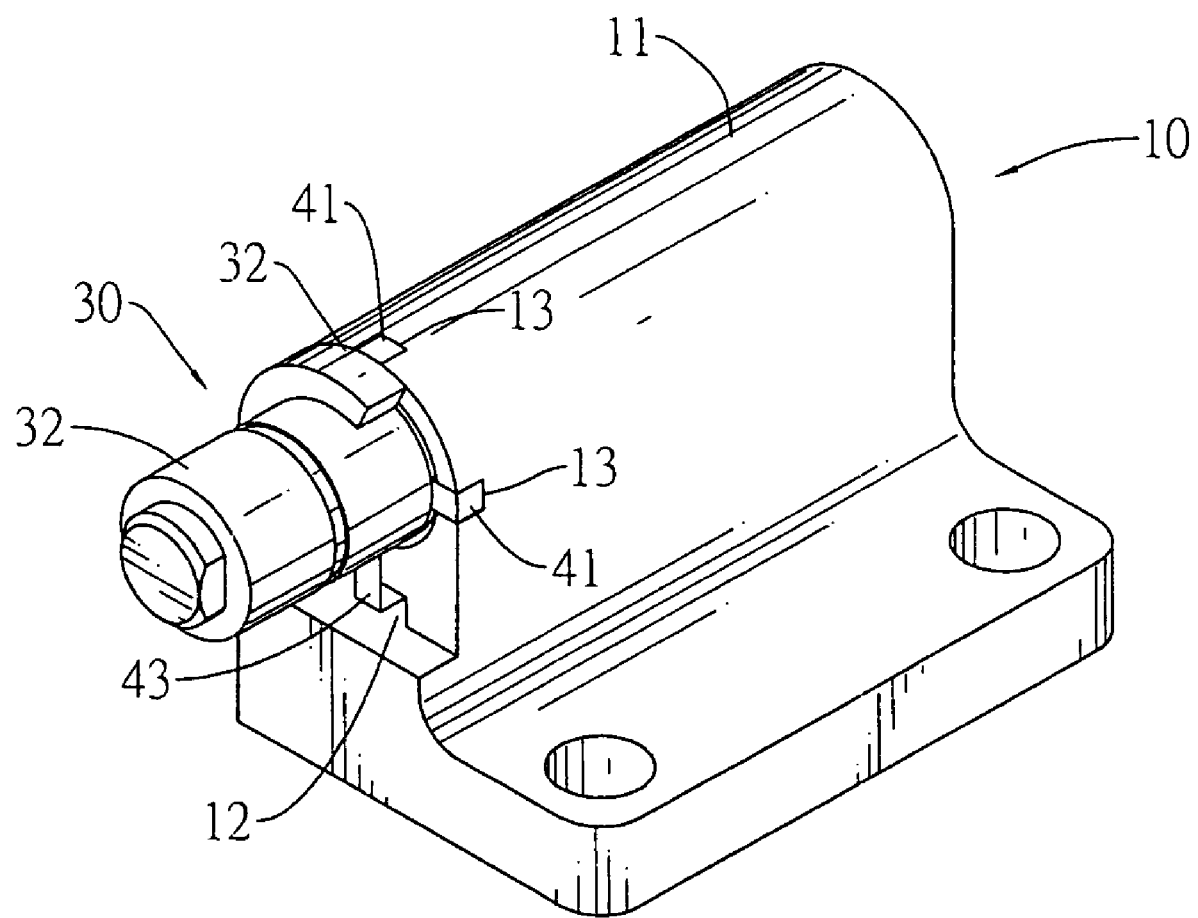
FIG. 4 is a perspective view of a second embodiment of a hinge in accordance with the present invention.
Figure 5:
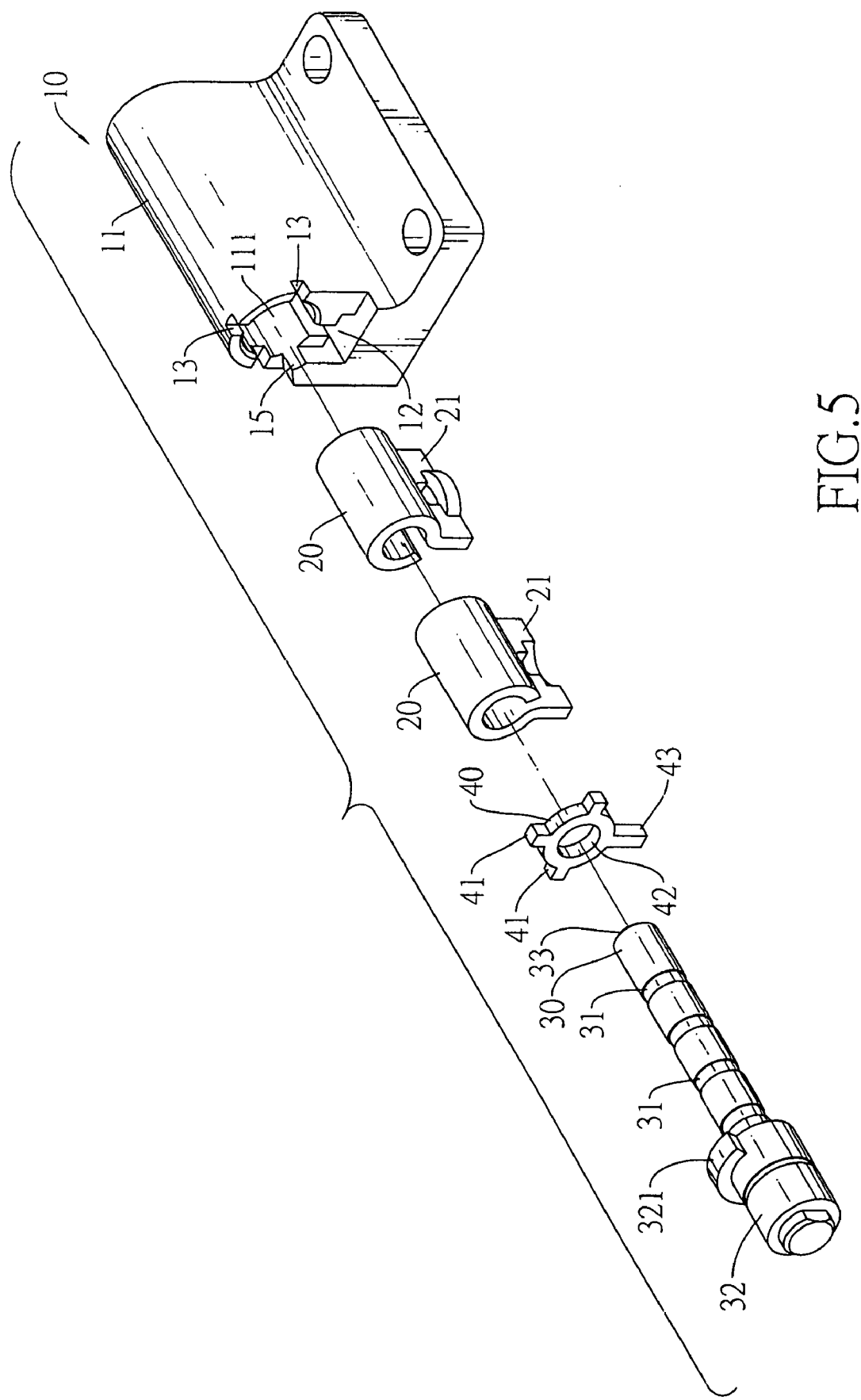
FIG. 5 is an exploded view of the hinge in FIG. 4.
Figure 6:
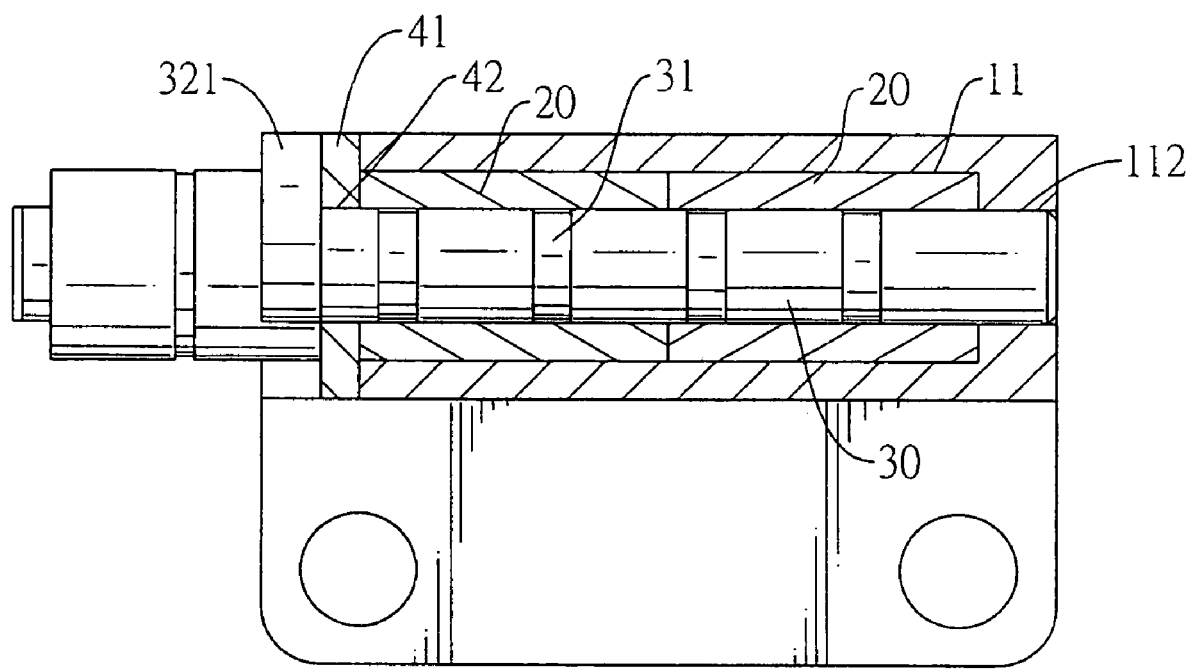
FIG. 6 is a top view in partial section of the hinge in FIG. 4.

With reference to FIGS. 4-6, the stationary bracket (10') further has a limit (15) formed on and extending out of the opening (111) of the sleeve (11'). The enlarged head (32') of the pintle (30') further has a limiting protrusion (321) formed transversely on the outer wall of the enlarged head (32') and selectively abutting against the limit (15) on the sleeve (11') to limit the rotation of the pintle.

Because the inner diameter of the keyhole (42) corresponds to the outer diameter of the bar to provide the tightness between the keyhole (42) and pintle (30') and the stop element

(40) and the pintle (30') seal the opening (111), the pintle (30') is sturdy in the sleeve (11') and the oil would not leak out of the sleeve (11').

Even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A hinge comprising:
    a stationary bracket having
        a sleeve being tubular and having
            a first end;
            a second end; and
            a first opening formed in the first end of the sleeve;
        multiple limiting notches formed in the first end of the sleeve and being adjacent to the first opening;
    two resilient spacers mounted securely in the sleeve;
    a pintle mounted rotatably in the resilient spacers and having
        a bar having
            multiple oil grooves formed around the bar;
            a protruding end protruding in the sleeve from the first opening; and
            an outer diameter; and
        an enlarged head being opposite to the protruding end; and
    a stop element mounted around the pintle between the enlarged head of the pintle and the resilient spacers and having
        multiple limiting tabs extending out of the stop element and corresponding to and mounted in the limiting notches in the stationary bracket; and
        a keyhole mounted around the pintle and having
            an inner diameter corresponding to the outer diameter of the bar.

2. The hinge as claimed in claim 1, wherein
    the sleeve further has
        a second opening formed in the second end of the sleeve and holing the protruding end of the pintle and having
            an inner diameter corresponding to the outer diameter of the pintle.

3. The hinge as claimed in claim 2, wherein
    the stationary bracket further has
        an elongated keyway formed longitudinally in the stationary bracket and communicating with the first opening in the sleeve;
    each resilient spacer further has
        a position-limiting tab mounted securely in the elongated keyway; and
    the stop element further has
        a key protrusion extending out of the stop element and mounted securely in the elongated keyway in the stationary bracket.

4. The hinge as claimed in claim 3, wherein
    the stationary bracket further has
        a limit formed on and extending out of the opening of the sleeve;
    the enlarged head of the pintle further has
        an outer wall;
        a limiting protrusion formed transversely on the outer wall of the enlarged head and selectively abutting against the limit on the sleeve.

5. The hinge as claimed in claim 1, wherein
    the stationary bracket further has
        an elongated keyway formed longitudinally in the stationary bracket and communicating with the first opening in the sleeve;
    each resilient spacer further has
        a position-limiting tab mounted securely in the elongated keyway; and
    the stop element further has
        a key protrusion extending out of the stop element and mounted securely in the elongated keyway in the stationary bracket.

6. The hinge as claimed in claim 5, wherein
    the stationary bracket further has
        a limit formed on and extending out of the opening of the sleeve;
    the enlarged head of the pintle further has
        an outer wall;
        a limiting protrusion formed transversely on the outer wall of the enlarged head and selectively abutting against the limit on the sleeve.

* * * * *